United States Patent
Lee et al.

(10) Patent No.: US 7,075,453 B2
(45) Date of Patent: Jul. 11, 2006

(54) METHOD FOR SETTING PRODUCT ADDRESS IN HOME NETWORK SYSTEM

(75) Inventors: Koon Seok Lee, Changwon-shi (KR); Seung Myun Baek, Changwon-shi (KR); Sam Chul Ha, Changwon-shi (KR); Hwan Jong Choi, Changwon-shi (KR); Ja In Koo, Jinju-shi (KR); Dae Woong Kim, Changwon-shi (KR); Jeong Hyun Lim, Kimhae-shi (KR); Sung Hwan Kang, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 286 days.

(21) Appl. No.: 10/471,337

(22) PCT Filed: Apr. 10, 2002

(86) PCT No.: PCT/KR02/00653

§ 371 (c)(1),
(2), (4) Date: Sep. 10, 2003

(87) PCT Pub. No.: WO03/058889

PCT Pub. Date: Jul. 17, 2003

(65) Prior Publication Data

US 2004/0119606 A1   Jun. 24, 2004

(30) Foreign Application Priority Data

Jan. 10, 2002   (KR)   ................................. 2002-1389

(51) Int. Cl.
*H02J 13/00* (2006.01)
*G05B 23/02* (2006.01)

(52) U.S. Cl. .................. 340/825.52; 340/3.5; 370/254; 370/255; 709/220; 709/222; 719/318

(58) Field of Classification Search .......... 340/825.52, 340/3.5; 370/254, 255; 709/220, 222; 719/318
See application file for complete search history.

(56) References Cited

U.S. PATENT DOCUMENTS 5,382,947 A * 1/1995 Thaler et al. .......... 340/825.22

(Continued)

FOREIGN PATENT DOCUMENTS

JP   60-112336   6/1985

(Continued)

*Primary Examiner*—Jeffrey Hofsass
*Assistant Examiner*—Scott Au
(74) *Attorney, Agent, or Firm*—McKenna Long & Aldridge LLP

(57) ABSTRACT

A method for setting a product address in a home network system is disclosed. The method includes a step for requesting a temporary address in which a network controller designates redundant addresses with a predetermined range to each product and requests an arbitrary address among the redundant address as a temporary address; a step for designating a temporary address in which each product designates an arbitrary address among the redundant addresses as a temporary address and informs to a network controller; and a step for confirming an address in which the network controller sequentially sets one of the redundant addresses for each address not doubled among informed temporary addresses from each product.

10 Claims, 2 Drawing Sheets

U.S. PATENT DOCUMENTS

| | | | | |
|---|---|---|---|---|
| 5,537,104 | A | * | 7/1996 | Van Dort et al. ........ 340/825.52 |
| 5,559,503 | A | * | 9/1996 | Blahut .................... 340/825.52 |
| 5,815,086 | A | * | 9/1998 | Ivie et al. ............... 340/825.52 |
| 6,009,103 | A | | 12/1999 | Woundy |
| 6,725,281 | B1 | * | 4/2004 | Zintel et al. ................. 719/318 |
| 6,901,439 | B1 | * | 5/2005 | Bonasia et al. ............. 709/220 |

FOREIGN PATENT DOCUMENTS

| | | |
|---|---|---|
| JP | 06-319176 | 11/1994 |
| JP | 9-330284 | 12/1997 |
| JP | 2001-28592 | 1/2001 |
| JP | 10-042271 | 2/2001 |

* cited by examiner

METHOD FOR SETTING PRODUCT ADDRESS IN HOME NETWORK SYSTEM

TECHNICAL FIELD

The present invention relates to a home network system, and more particularly, to a method for setting a product address in a home network system.

BACKGROUND ART

Currently, the home automation almost comes to a stage to put into practical use, in which home products are controlled automatically in a home or far from the home. Though an initial home automation is at a level the products are controlled separately by using a telephone or an infrared ray, without interconnection between the products, currently a method is used, in which a network of the products are constructed by employing communication means, and a controller for controlling the network is provided, for integrated management of the network.

FIG. 1 illustrates a home network, schematically.

A lot of home products, such as a refrigerator, an air conditioner, a microwave oven, a washing machine, a personal computer (PC), and the like, are connected through a communication bus, to form a home network.

When microcomputers of the products have a serial communication function, a communication bus may be connected between the products, to form a home network as shown in FIG. 2, and when the microcomputers of the products have no serial communication function, communication modules may be fitted to the products additionally, to form a home network as shown in FIG. 3. A controller may be set up for controlling the home network formed thus, wherein, currently as most of homes have personal computers, the personal computer may be made to be operative as the network controller by providing an application program to the personal computer for controlling the network, without providing a separate controller.

A network control of the home network is made as the home products in the home network exchange communication data according to communication standards, of which communication data has a structure as shown in FIG. 4. The structure of the communication network has a preamble, a receiver code for designating a receiver, an product, of the communication data, a transmitter code for designating a transmitter of the communication data, a control code for specifying an actual control order, and an error check code.

A variety of network controls may be available depending on how the control code is specified.

Moreover, the products have communication conditions set up therein for transmission of the communication data.

As an example, the operation of the network will be described under assumption that the communication condition of a washing machine is finish of a washing, the receiver code is an air conditioner, and the control code is specified such that a word of wash finished is displayed on a display, and, at the same time, a melody is produced from a buzzer for announcing finish of the washing.

Upon finishing the washing, the washing machine transmits a communication data including above specification to the air conditioner. Then, as the receiver code in the communication data is the same with its own, the air conditioner reads in the communication data, detects the control code, displays a text of the wash finished on the display, i.e., on an LCD panel, and puts the buzzer into operation to produce a melody announcing wash finished.

In a case the home products in the home network are not from the same manufacturer, there may be differences in communication standards and the like, and the home products may vary as one product is not provided, or replaced, or added, depending on user's taste. Therefore, even though a representative address is set up to every product at the time of manufacturing the product, setting of the product addresses following organizing a network is required for making an effective control of the network even in cases the manufacturers of the products in the network are different, or the net work varies.

DISCLOSURE OF INVENTION

An object of the present invention designed for solving the foregoing problem lies on providing a method for setting a product address in a home network system, in which addresses of products are set up to permit a stable control regardless of variation of manufacturers, and products in the network.

Theses and other objects of the present invention can be achieved by providing a method for setting a product address in a home network system having a plurality of products and a network controller for controlling and managing the plurality of products, including a temporary address requesting step of the network controller assigning a range of allowable addresses to each of the products, and requesting the product to set one of the allowable addresses as a temporary address of the product, a temporary address setting step of the product setting, and informing one of the allowable address as the temporary address of the product, and an address fixing step of the network controller assigning one of the allowable address to each of non-duplicated addresses out of the temporary addresses informed from the products.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings. In explaining embodiments of the present invention, identical parts will be given the same names and reference symbols, and iterative explanation of which will be omitted.

Figure 5:
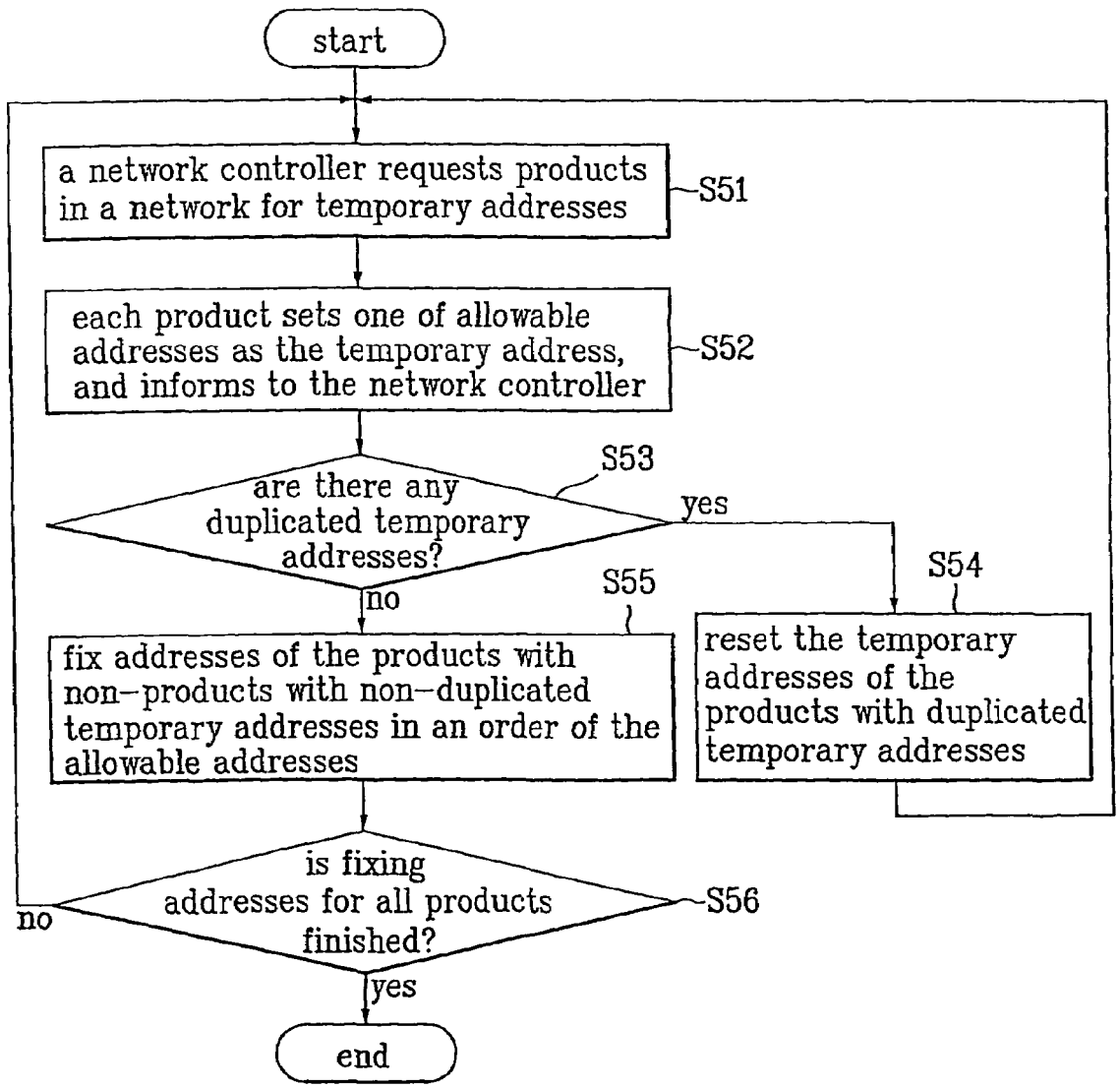
FIG. 5 illustrates a flow chart showing the steps of a method for setting a product address in a home network system in accordance with a preferred embodiment of the present invention.

FIG. 5 illustrates a flow chart showing the steps of a method for setting a product address in a home network system in accordance with a preferred embodiment of the present invention.

Figure 1:
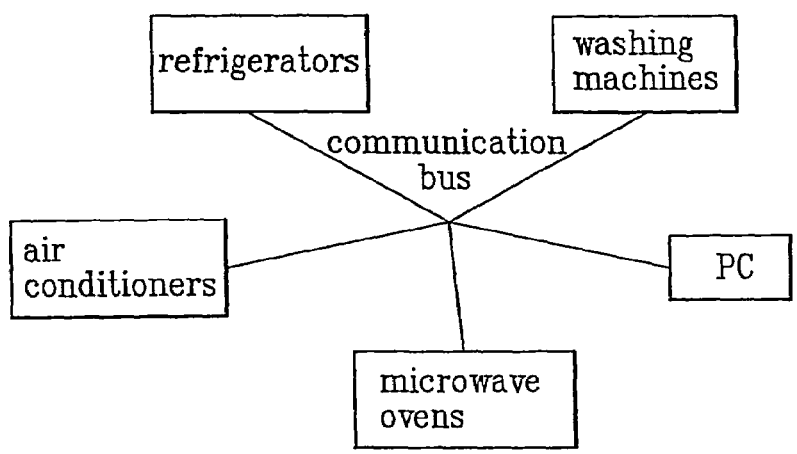
FIG. 1 illustrates a block diagram of a home network system, schematically.
Figure 2:
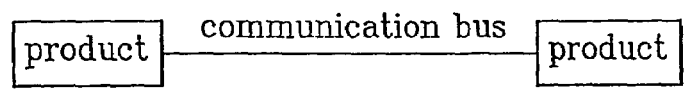
FIG. 2 illustrates a block diagram of a communication bus connection by using a serial communication function.
Figure 3:
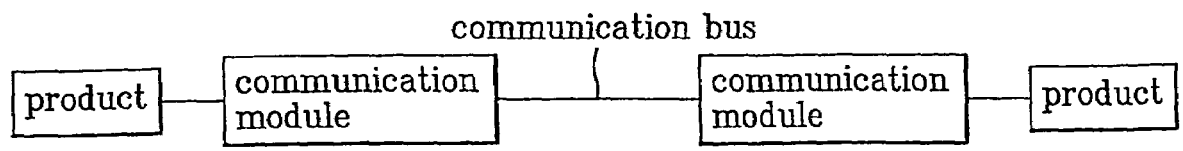
FIG. 3 illustrates a block diagram of a communication bus connection by using separate communication module.
Figure 4:
FIG. 4 illustrates a block diagram of a communication data structure.

In the home network system of the present invention, communication buses described in association with FIG. 3 connect the products. The communication module has an algorithm programmed therein for coding/decoding a communication data according to communication standards which is standardized and facilitates communication regardless of manufacturers, and kind of products, thereby permitting all products being put into a network and is controlled regardless of the manufacturers.

Of course, the microcomputer in each of the product may have an algorithm programmed therein.

In order to explain a method for setting a product address in a home network system, it is assumed that the home network has a plurality of air conditioners, washing machines, and refrigerators. In this instance, for an example, the air conditioners have the same representative addresses (for an example, 0x20) set at shipment.

Referring to FIG. 5, at first, a network controller transmits a communication data to a predetermined product group, i.e., the plurality of air conditioners, for requesting to set temporary addresses (S51). Accordingly, the communication data is transmitted to the microcomputer in each air conditioner through the communication module.

In this instance, the communication data has optional allowable addresses 0x21–0x2E set therein. Therefore, the microcomputer in each of the air conditioner selects one of the allowable addresses by putting a random-number generator into operation, and sets a temporary address, and informs the temporary address to the network controller (S52).

Then, the network controller determines existence of duplicated addresses in the temporary addresses (S53), resets the temporary addresses of the products of the duplicated temporary addresses as initial representative addresses (S54), and returns to the step (S51).

On the other hand, the non-duplicated addresses are fixed in an order of the allowable addresses, and relevant products are called again (S55).

For an example, if the non-duplicated temporary addresses are 0x2A, 0x25, and 0x23, and the allowable addresses are 0x21–0x2E, the address of the product having the temporary address of 0x23 is fixed as 0x21, the address of the product having the temporary address of 0x25 is fixed as 0x25, and the address of the product having the temporary address of 0x2A is fixed as 0x23.

Thereafter, if there are duplicated addresses, the foregoing address fixing processes are repeated for the products with the duplicated addresses.

The network controller may change the fixed addresses as required.

When the fixing of addresses is finished for the air conditioners according to the foregoing process, finish of the address fixing for all products are determined (S56).

If the address fixing for all products is not finished (since the address fixing for the air conditioner is finished at the present time), the foregoing processes are repeated for washing machines and the refrigerators, to finish the address fixing for all products in the network.

It will be apparent to those skilled in the art that various modifications and variations can be made in the method for setting a product address in a home network system of the present invention without departing from the spirit or scope of the invention. Thus, it is intended that the present invention cover the modifications and variations of this invention provided they come within the scope of the appended claims and their equivalents.

What is claimed is:

1. A method for setting a product address in a home network system having a plurality of products and a network controller for controlling and managing the plurality of products, comprising:

a temporary address requesting step of the network controller assigning a range of allowable addresses to a product, and requesting that the product select one address from said range of allowable addresses as a temporary address of the product;

a temporary address setting step of the product selecting one address from said range of allowable addresses as the temporary address of the product, and informing said network controller of the selected temporary address; and an address fixing step of the network controller assigning said temporary address to the product.

2. A method as claimed in claim 1, wherein the temporary address is selected randomly from said range of allowable addresses in the temporary address setting step.

3. A method as claimed in claim 1, wherein the address fixing step further comprises determining whether said temporary address is a duplicated address, and repeating the temporary address requesting step, the temporary address setting step, and the address fixing step if it is determined that said temporary address is a duplicated address.

4. A method as claimed in claim 3, wherein said address fixing step further comprises setting the temporary address to an initial address of the product if the selected temporary address is determined to be a duplicated address.

5. A method for setting a product address in a home network system having at least one product and a network controller for controlling and managing the at least one product, said method comprising:

identifying a range of allowable addresses;

requesting that the at least one product select one address from said range of allowable addresses as a temporary address;

receiving said temporary address selected by the at least one product; and assigning said temporary address to the at least one product.

6. A method as claimed in claim 5 further comprising:

determining whether the temporary address selected by the at least one product is a duplicate address.

7. A method as claimed in claim 6 further comprising:

repeating said identifying, said requesting, said receiving and said assigning steps if it is determined that the temporary address selected by the at least one product is a duplicate address.

8. A method for setting a product address in a home network system having at least one product and a network controller for controlling and managing the at least one product, said method comprising:

receiving from the network controller a request to select one address from a range of allowable addresses as a temporary address of the product;

selecting one address from said allowable addresses as the temporary address; and transmitting to the network controller information conveying the selection of the temporary address.

9. A method as claimed in claim 8 further comprising:

determining whether the temporary address is a duplicate address.

10. A method as claimed in claim 9 further comprising:

repeating said receiving, said selecting and said transmitting steps if it is determined that the temporary address is a duplicate address.

* * * * *